(12) United States Patent
Vernon

(10) Patent No.: US 10,745,266 B1
(45) Date of Patent: Aug. 18, 2020

(54) TANK VAPOR BURNER SYSTEM

(71) Applicant: James B. Vernon, Oklahoma City, OK (US)

(72) Inventor: James B. Vernon, Oklahoma City, OK (US)

(73) Assignee: Vapor Recovery Solutions LLC, Oklahoma City, OK (US)

( * ) Notice: Subject to any disclaimer, the term of this patent is extended or adjusted under 35 U.S.C. 154(b) by 97 days.

(21) Appl. No.: 15/880,237

(22) Filed: Jan. 25, 2018

Related U.S. Application Data

(60) Provisional application No. 62/450,649, filed on Jan. 26, 2017.

(51) Int. Cl.
  *B01D 53/02* (2006.01)
  *B67D 7/04* (2010.01)
  *F23G 7/06* (2006.01)
  *B67D 7/78* (2010.01)
  *B67D 7/82* (2010.01)

(52) U.S. Cl.
  CPC ............. *B67D 7/0492* (2013.01); *F23G 7/06* (2013.01); *B67D 7/78* (2013.01); *B67D 7/82* (2013.01)

(58) Field of Classification Search
  CPC .. B67D 7/092; B67D 7/78; B67D 7/82; F23G 7/06
  See application file for complete search history.

(56) References Cited

U.S. PATENT DOCUMENTS

| | | | | |
|---|---|---|---|---|
| 4,362,213 A | * | 12/1982 | Tabor | E21B 43/168 166/267 |
| 4,579,565 A | * | 4/1986 | Heath | E21B 43/34 95/15 |
| 2010/0150658 A1 | * | 6/2010 | Bilhete | F23G 5/006 405/128.15 |
| 2015/0267129 A1 | * | 9/2015 | Meyer | C10G 7/02 196/46 |
| 2015/0337218 A1 | * | 11/2015 | Ricotta | C10L 3/10 208/187 |
| 2017/0335205 A1 | * | 11/2017 | Meyer | C10G 7/00 |
| 2018/0274347 A1 | * | 9/2018 | Ricotta | C10L 3/06 |

* cited by examiner

*Primary Examiner* — Christopher P Jones
(74) *Attorney, Agent, or Firm* — Phillips Murrah PC; Martin G. Ozinga

(57) ABSTRACT

The present invention essentially comprises a system to eliminate and or reduce unwanted vapors from oil by providing a conduit from a vessel holding accumulated oil and communicating the vapors to a burner at a tank battery system.

1 Claim, 2 Drawing Sheets

TANK VAPOR BURNER SYSTEM

CROSS-REFERENCE TO RELATED APPLICATIONS

Priority is claimed from provisional patent application U.S. Ser. No. 62/450,649 filed on Jan. 26, 2017 and incorporated by reference herein.

BACKGROUND OF THE INVENTION

1. Field of the Invention

In general, the present invention relates to an apparatus, system and method of vapor recovery from accumulated oil in a vessel and the reusing of the same. More particularly, the present invention provides a new and improved vapor recovery system that utilizes captured vapors from accumulated oil from oil tanks and or processing tanks to fuel a burner associated with vapor removal.

2. Description of the Prior Art

In the oil and gas industry, it is known that wells produce not just oil, but gas also. Although the majority of gas is recovered and passed into a separate storage vessel or sales line designed to hold natural gas, the separated oil goes into storage tanks. It is understood that the gaseous elements continue to be released or evaporate from the accumulated oil even after the separation. It is also understood that oil in liquid form continues to release gasses and that the grade of the oil is a direct correlation to its volatility and thereby, its release of gaseous elements.

A major concern facing the field is the ever growing and constant concern with environmental impact of oil and gas production coupled with the ever increasing need to maximize efficiency and recovery. Prior art methods that were perfectly acceptable just years ago are now politically and environmentally unfriendly as well as wasteful in hindsight. Whereas it was acceptable to vent and or burn off vapors from oil and processing tanks associated with well production, it is not considered a viable economic or environmentally sound method or process to do so.

The EPA is also now requiring that oil and gas companies eliminate vapors coming off their oil tanks. When the well is new, the oil company can make money by installing a vapor recovery unit to compress and sell these tank vapors. Later on in the well life, there are not enough tank vapors to cover the rental cost of the vapor recovery unit and so a vapor combustor is purchased and the tank vapors are sent to the combustor to be burned. Current gas flares and or incinerators cost at least $15,000 plus the cost of hookup.

Almost every tank battery on a new well will have a heater treater or some type of process burner on the location. This process of burning the vapors obviously requires a fuel source for the burners. Therefore, it is desirable to provide a process that will conserve gas by eliminating the need to supply burners with marketable gas and instead supplying it with gas that will be burned up anyway.

The above discussed limitations in the prior art is not exhaustive. Thus, there is a need for an apparatus, method and system to recycle gas from oil tanks for the purpose of burning vapors from same. The current invention provides an inexpensive, time saving, more reliable apparatus and method of fueling burners associated with vapor removal from oil and processing tanks where the prior art fails.

SUMMARY OF THE INVENTION

In view of the foregoing disadvantages inherent in the known types of vapor recovery systems and vapor removal from oil tanks and or processing tanks now present in the prior art, the present invention provides a new and improved vapor disposal system. As such, the general purpose of the present invention, which will be described subsequently in greater detail, is to provide a new and improved vapor removal system, which has all the advantages of the prior art devices and less and or none of the disadvantages.

To attain this, the present invention essentially comprises a vapor recovery tank or tower in communication with a burner via a conduit wherein vapor released from the accumulating oil may be recycled into a fuel source for a burner associated with a heater treater and or process burner for the removal of unwanted vapors in the system in general. It is understood that the conduit may be also generally placed at the top of the oil tank and or process tank wherein the rising vapors may be found and then sent to the combustion burner, a vapor recovery tank, a tower, and or other vessels wherein oil accumulates and produces vapors.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved vapor disposal system for oil tanks, processing tanks, vapor recovery tanks, and vessels in general, which may utilize vapors from accumulated oil to burn unwanted vapors from same.

It is a further object of the present invention to provide a new and improved vapor disposal system for oil tanks and or processing tanks, which is of a durable and reliable construction and may be utilized in numerous types of well operations.

An even further object of the present invention is to provide a new and improved vapor disposal system for oil tanks and or processing tanks, which is susceptible to a low cost of manufacture with regard to both materials and labor, and which accordingly is then susceptible to low prices of sale to the consuming industry, thereby making such economically available to those in the field.

Still another object of the present invention is to provide a new and improved vapor disposal system for oil tanks and or processing tanks, which provides all of the advantages of the prior art, while simultaneously overcoming some of the disadvantages normally associated therewith.

Another object of the present invention is to provide a new and improved vapor disposal system for oil tanks and or processing tanks that provides a more environmentally friendly application over the prior art methods.

Yet another object of the present invention is to provide a new and improved vapor disposal system for oil tanks and or processing tanks that may be retrofitted to current vapor recovery tanks as well as installed on new vapor recovery tanks.

An even further object of the present invention is to provide a new and improved vapor disposal system for oil tanks and or processing tanks that may be easily and efficiently manufactured and marketed to the oil and gas industry.

Still another object of the present invention is to provide a new and improved vapor disposal system for oil tanks and or processing tanks that disposes of unwanted vapors and is EPA compliant.

Yet another object of the present invention is to provide a new and improved vapor disposal system for oil tanks and or processing tanks that may eliminate and or reduce the need for vapor recovery units known in the art.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS AND APPENDICES

The invention will be better understood and objects other than those set forth above will become apparent when consideration is given to the following detailed description thereof. Such description makes reference to the annexed pictorial illustrations, graphs, drawings, and appendices wherein.

DETAILED DESCRIPTION OF THE PREFERRED EMBODIMENTS

Figure 1:
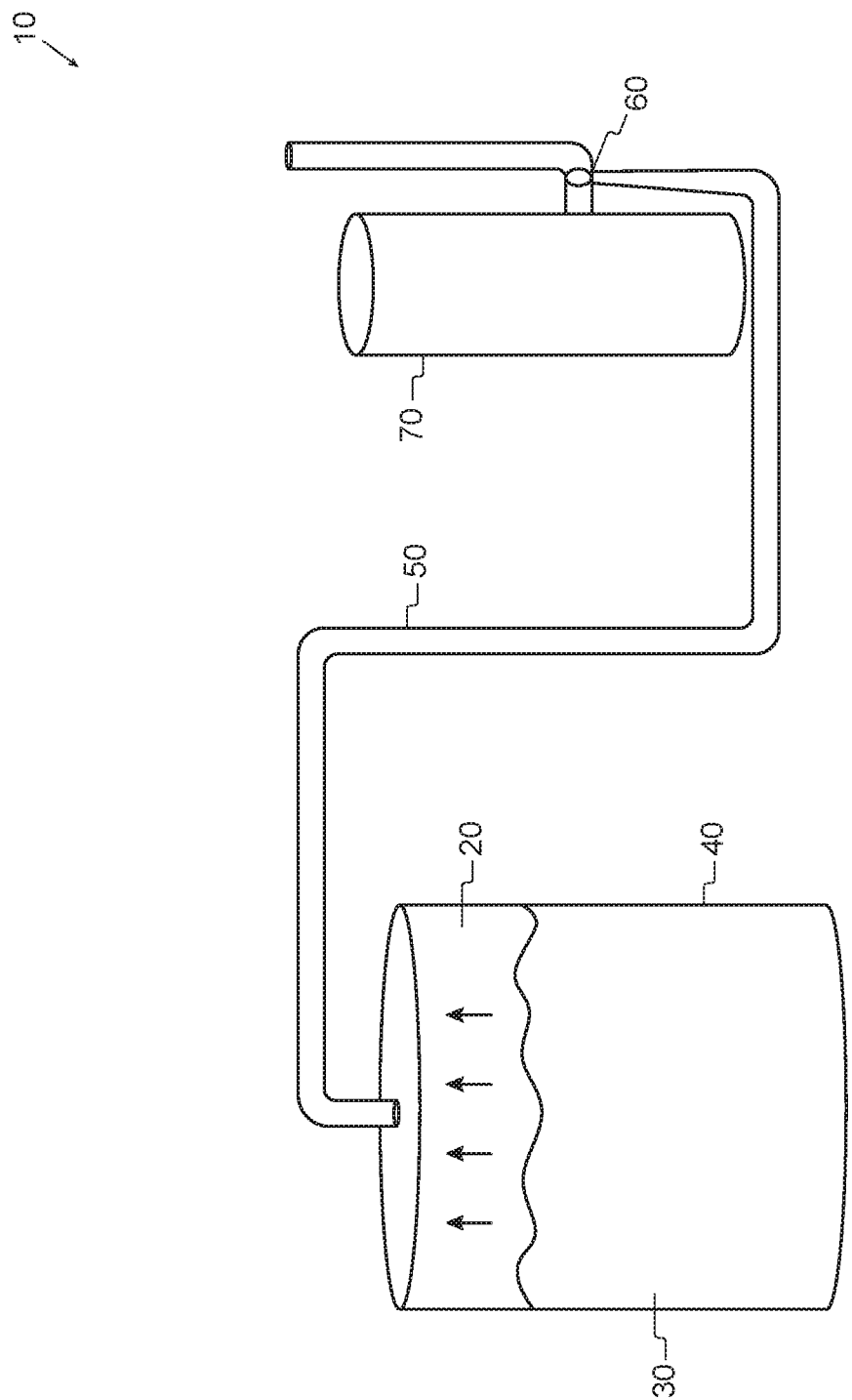
FIG. 1 is a general illustration of a preferred embodiment of the invention depicting an oil tank and or processing tank and or vessel in communication with a burner for a heater treater for oil and gas operations.

Referring to the illustrations, drawings, and pictures, and to the figures in particular, reference character 10 generally designates a new and improved vapor disposal system and method of using same constructed in accordance with the present invention. Invention 10 is generally used in well operations associated with oil and gas, although, it is understood that other numerous applications are contemplated and the current invention should not be considered limited to just oil and gas operations.

Referring to the illustrations and more in particular to FIG. 1, invention 10 contemplates taking vapors 20 from accumulated oil 30 held in a tank and or vessel 40 and circulating vapors 20 via a conduit 50 to be burned as fuel in a burner 60. These burners 60 could be a heater treater 70, line heater, coalescer, tank burner, and so forth. It is understood that the current invention is not limited to just heater treater 70 applications.

Figure 2:
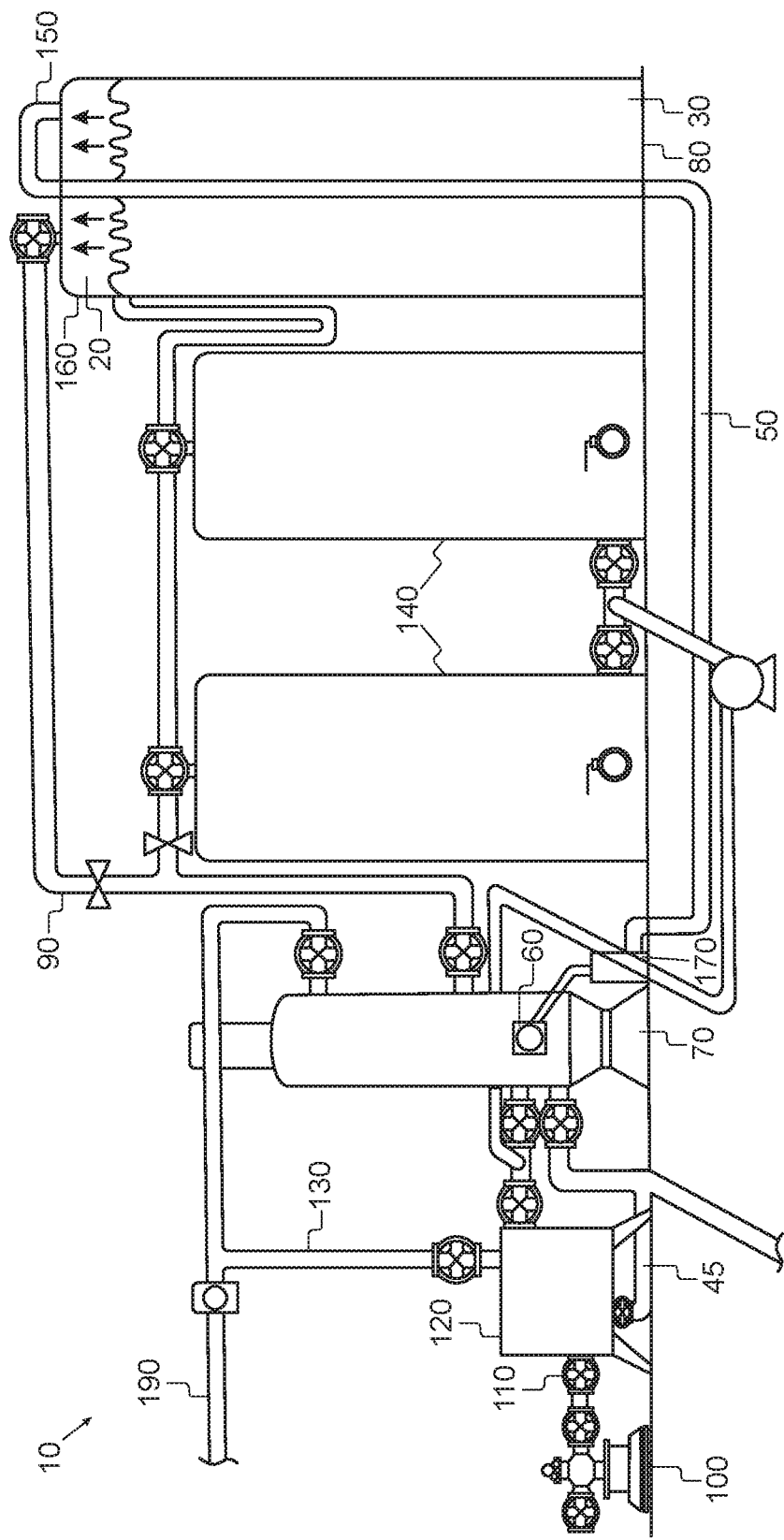
FIG. 2 is a general illustration of a preferred embodiment of the invention depicting a vapor recovery tank in communication with a burner associated with a heater treater.

Referring to FIG. 2 in more specific, invention 10 may be utilized with vessel 40 such as but not limited to a vapor recovery tank 80 as generally found in a tank battery system 90. FIG. 2 generally depicts vapor recovery tank 80 that is used in combination with conventional oil and gas well production equipment where oil and gas is drawn from well 100 through flow line 110. It is understood that tank battery system 90 may have numerous configurations, numbers of holding tanks 140, separation and or separator equipment 120, and so forth known in the art. The current invention 10 should not be considered limited to just the depiction and the depiction is for illustrative purposes.

It is understood that separator equipment 120 may separate the oil 30, gas 130, and water 45 and move the gas 130 through a sales line 190, which may be a pipe connected to natural gas companies' distribution networks as known in the prior art. The oil 30 may be pushed and accumulated into vapor recovery tank 80 and holding tanks 140, where it is stored until the holding tank 140 is generally full and ready to be distributed for sale.

Invention 10 contemplates an outlet 150 on top 160 of vapor recovery tank 80 that is connected to conduit 50. Burner 60 is in communication with vapor recovery tank 80 for receiving vapor 20 from same. Conduit 50 may lead to a fuel scrubber 170 although it is contemplated to not have same also.

Invention further may include a dual burner. If the vapor recovery tank 80 vapors 20 are not enough to fully heat the vessel, a second burner may be utilized with one to burn the tank vapors, and one from sellable gas, in case more heat is necessary in the vessel.

It is therefore contemplated the invention may be an oil vapor removal system comprising a well head that produces oil and gas; a sales line in communication with said well head and adapted to transport said gas from said well head for sale; a heater treater having a burner in communication with said well head and adapted to heat said oil from said well head and burn a new gas that emanates from said oil that is being heated; a vapor recovery tank in communication with said heater treater for storing said oil from said heater treater and adapted to capture an oil vapor produced by said oil that has accumulated in said vapor recovery tank; a conduit from said vapor recovery tank to said heater treater for transporting said oil vapor to said burner of said heater treater for fueling said burner; and at least one holding tank in communication with said heater treater and said oil vapor recovery tank and adapted to store said oil from said heater treater.

Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

What is claimed is:

1. An oil vapor removal system comprising:
a well head that produces oil, water and gas;
a separator for separating said water from said oil and said gas for disposal;
a sales line in communication with said separator and adapted to transport said gas from said well head for sale;
a heater treater having a burner in communication with said separator and adapted to heat said oil from said separator well and burn a new gas that emanates from said oil that is being heated;
a vapor recovery tank in communication with said heater treater for storing said oil from said heater treater and adapted to capture an oil vapor produced by said oil that has accumulated in said vapor recovery tank;
a conduit from said vapor recovery tank to said heater treater for transporting said oil vapor to said burner of said heater treater for fueling said burner; and
at least one holding tank in communication with said heater treater and said oil vapor recovery tank and adapted to store said oil from said heater treater.

* * * * *